(12) United States Patent
Fukuyama

(10) Patent No.: US 8,797,384 B2
(45) Date of Patent: Aug. 5, 2014

(54) VIDEO SIGNAL PROCESSING APPARATUS AND VIDEO SIGNAL PROCESSING METHOD OUTPUTTING THREE-DIMENSIONAL AND TWO-DIMENSIONAL OUTPUT SIGNALS IN PARALLEL

(75) Inventor: Masayuki Fukuyama, Osaka (JP)

(73) Assignee: Panasonic Corporation, Osaka (JP)

( * ) Notice: Subject to any disclaimer, the term of this patent is extended or adjusted under 35 U.S.C. 154(b) by 129 days.

(21) Appl. No.: 13/437,967

(22) Filed: Apr. 3, 2012

(65) Prior Publication Data

US 2012/0188338 A1    Jul. 26, 2012

Related U.S. Application Data

(63) Continuation of application No. PCT/JP2010/003161, filed on May 10, 2010.

(30) Foreign Application Priority Data

Oct. 14, 2009    (JP) ................................. 2009-237776

(51) Int. Cl.
*H04N 13/00*    (2006.01)
*H04N 13/04*    (2006.01)
*H04N 7/01*    (2006.01)

(52) U.S. Cl.
CPC ....... *H04N 13/0029* (2013.01); *H04N 13/0454* (2013.01); *H04N 7/0127* (2013.01)
USPC .......................................................... 348/43

(58) Field of Classification Search
CPC  H04N 13/00; H04N 13/0029; H04N 13/0055
USPC .......................................................... 348/43
See application file for complete search history.

(56) References Cited

U.S. PATENT DOCUMENTS 5,717,415 A    2/1998  Iue et al.
7,027,664 B2 *  4/2006  Lee et al. ...................... 382/283

(Continued)

FOREIGN PATENT DOCUMENTS

CN    101222648    7/2008
JP    07-226958    8/1995

(Continued)

OTHER PUBLICATIONS

International Search Report issued Aug. 10, 2010 in International (PCT) Application No. PCT/JP2010/003161.

(Continued)

*Primary Examiner* — Jay Patel
*Assistant Examiner* — Francis G Geroleo
(74) *Attorney, Agent, or Firm* — Wenderoth, Lind & Ponack, L.L.P.

(57) ABSTRACT

A video signal processing apparatus includes: an input unit which receives a 3D input signal including a left-eye input signal and a right-eye input signal; an image processing unit which performs image processing on the 3D input signal inputted to the input unit, to generate a 3D output signal including a left-eye output signal and a right-eye output signal; an image converting unit which extracts one of the left-eye output signal and the right-eye output signal from the 3D output signal generated by the image processing unit, to generate a 2D output signal; a 3D output terminal which outputs the 3D output signal generated by the image processing unit; and a 2D output terminal which outputs the 2D output signal generated by the image converting unit, in parallel with the output of the 3D output signal from the 3D output terminal.

6 Claims, 8 Drawing Sheets

(56) References Cited

U.S. PATENT DOCUMENTS

| | | | |
|---|---|---|---|
| 7,724,271 B2 * | 5/2010 | Ha et al. | 345/698 |
| 8,089,507 B2 * | 1/2012 | Ikeda et al. | 348/43 |
| 8,149,229 B2 | 4/2012 | Lee | |
| 2006/0062490 A1 | 3/2006 | Ha et al. | |
| 2008/0062172 A1 * | 3/2008 | Lin et al. | 345/424 |
| 2008/0170274 A1 | 7/2008 | Lee | |
| 2009/0142041 A1 * | 6/2009 | Nagasawa et al. | 348/42 |
| 2010/0020083 A1 | 1/2010 | Kumakura et al. | |
| 2010/0103318 A1 * | 4/2010 | Wang et al. | 348/565 |
| 2010/0182402 A1 * | 7/2010 | Nakajima et al. | 348/42 |
| 2010/0220083 A1 | 9/2010 | Kim | |

FOREIGN PATENT DOCUMENTS

| | | |
|---|---|---|
| JP | 09-331551 | 12/1997 |
| JP | 2001-352562 | 12/2001 |
| JP | 2003-289553 | 10/2003 |
| JP | 2005-136541 | 5/2005 |
| JP | 2005-260810 | 9/2005 |
| JP | 2006-033851 | 2/2006 |
| JP | 2008-113272 | 5/2008 |
| JP | 2009-135686 | 6/2009 |
| JP | 2009-524376 | 6/2009 |
| WO | 2007/083982 | 7/2007 |

OTHER PUBLICATIONS

Chinese Office Action with Search Report mailed Jan. 6, 2014 for corresponding Chinese Patent Application No. 201080045974.1, including English translation.

* cited by examiner

VIDEO SIGNAL PROCESSING APPARATUS AND VIDEO SIGNAL PROCESSING METHOD OUTPUTTING THREE-DIMENSIONAL AND TWO-DIMENSIONAL OUTPUT SIGNALS IN PARALLEL

CROSS REFERENCE TO RELATED APPLICATION

This is a continuation application of PCT Patent Application No. PCT/JP2010/003161 filed on May 10, 2010, designating the United States of America, which is based on and claims priority of Japanese Patent Application No. 2009-237776 filed on Oct. 14, 2009. The entire disclosures of the above-identified applications, including the specifications, drawings and claims are incorporated herein by reference in their entirety.

TECHNICAL FIELD

The present invention relates to video signal processing apparatuses and particularly to a video signal processing apparatus which outputs a two-dimensional video signal and a three-dimensional video signal.

BACKGROUND ART

Conventionally, there is known a three-dimensional video display apparatus which displays three-dimensional video that provides a viewer with stereoscopic perception (for example, see Japanese Unexamined Patent Application Publication No. 2005-136541). This three-dimensional video display apparatus displays the three-dimensional video which provides the viewer with stereoscopic perception, by displaying a left-eye image and a right-eye image which have a parallax therebetween according to a predetermined method. For example, the three-dimensional display apparatus alternately displays a frame of the left-eye image and a frame of the right-eye image.

There is also known a technique for causing a display apparatus (display) connected to a video signal processing apparatus by generating and/or editing a three-dimensional video signal using the video signal processing apparatus, such as a Blu-ray Disc (BD) player.

CITATION LIST

Patent Literature

[PTL1]
Japanese Unexamined Patent Application Publication No. 2005-136541

SUMMARY OF INVENTION

Technical Problem

It is desirable that such a video signal processing apparatus is provided with plural terminals each having different output format, so as to be compatible with a legacy device or the like. When the video signal processing apparatus has plural terminals, a case is assumed that one of the terminals is connected with a 3D-compatible device and the other of the terminals is connected with a non-3D-compatible device. Moreover, a case is also possible that is to cause the 3D-compatible device to display 3D video while causing the non-3D-compatible device to record 2D video that corresponds to the 3D video.

The present invention is conceived in view of the above problem, and has an object to provide a video signal processing apparatus including plural connection interfaces according to a function of, a connected device.

Solution to Problem

A video signal processing apparatus according to the present invention includes: an input unit which receives a three-dimensional input signal including a left-eye input signal and a right-eye input signal; an image processing unit which performs image processing on the three-dimensional input signal inputted to the input unit, to generate a three-dimensional output signal including a left-eye output signal and a right-eye output signal; an image converting unit which extracts one of the left-eye output signal and the right-eye output signal from the three-dimensional output signal generated by the image processing unit, to generate a two-dimensional output signal; a first output terminal which outputs the three-dimensional output signal generated by the image processing unit; and a second output terminal which outputs the two-dimensional output signal generated by the image converting unit, in parallel with the output of the three-dimensional output signal from the first output terminal.

With the above structure, the three-dimensional video signal is outputted from the first output terminal and the two-dimensional in video signal is outputted from the second output terminal in parallel, whereby an appropriate interface can be selected according to the function of the connected device.

As an example, the three-dimensional output signal may be a line sequential signal in which a line of the left-eye output signal and a line of the right-eye output signal are alternately outputted. The image converting unit may include a 3D/2D converting unit which extracts one of the left-eye output signal and the right-eye output signal from the three-dimensional output signal by repeating, until detecting a vertical synchronizing signal indicating a breakpoint of a picture, processing of (i) detecting a horizontal synchronizing signal indicating a start of the one of the left-eye output signal and the right-eye output signal and (ii) reading a signal of a predetermined length that starts from a point at which the horizontal synchronizing signal is detected.

As another example, the three-dimensional output signal may be a frame sequential signal in which a picture of the left-eye output signal and a picture of the right-eye output signal are alternately outputted. The image converting unit may include a 3D/2D converting unit which extracts one of the left-eye output signal and the right-eye output signal from the three-dimensional output signal by (i) detecting a vertical synchronizing signal indicating a breakpoint of a picture and (ii) switching between executing and stopping processing of reading a signal at, each time detecting the vertical synchronizing signal.

Moreover, the image converting unit may further include a definition converting unit which converts definition of a signal outputted by the 3D/2D converting unit. This enables, for example, to output a two-dimensional output signal to an output terminal of such as a composite or a digital/analog converter (DAC).

Furthermore, the image processing unit may include: a resizing unit which changes a size of the input signal; a format converting unit which converts the signal outputted from the resizing unit into a signal compatible with an output format; and an On Screen Display (OSD) superimposing unit which superimposes another signal onto at least one of a signal prior to processing by the format converting unit and a signal after the processing by the format converting unit.

The video signal processing method according to the present invention includes: receiving a three-dimensional input signal including a left-eye input signal and a right-eye input signal; performing image processing on the three-dimensional input signal inputted in the receiving to generate a three-dimensional output signal including a left-eye output signal and a right-eye output signal; extracting one of the left-eye output signal and the right-eye output signal from the three-dimensional output signal generated in the performing image processing to generate a two-dimensional output signal; outputting the three-dimensional output signal generated in the performing image processing; and outputting the two-dimensional output signal generated in the extracting, in parallel with the output of the three-dimensional output signal in the outputting of the three-dimensional output signal.

Advantageous Effects of Invention

The present invention allows the three-dimensional display apparatus to output three-dimensional video signal from the first output terminal and the two-dimensional video signal from the second output terminal in parallel, whereby an appropriate interface can be selected according to the function of the connected device.

BRIEF DESCRIPTION OF DRAWINGS

These and other objects, advantages and features of the invention will become apparent from the following description thereof taken in conjunction with the accompanying drawings that illustrate a specific embodiment of the present invention. In the Drawings.

DESCRIPTION OF EMBODIMENT

An embodiment of the present invention is described below with reference to figures.

Embodiment 1

Figure 1:
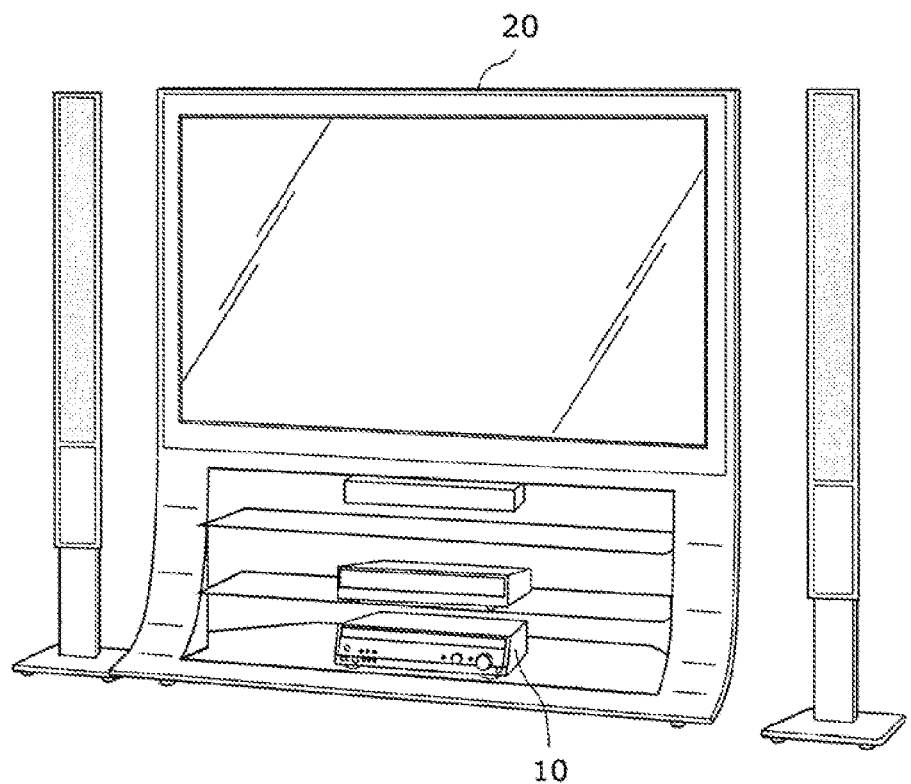
FIG. 1 is a schematic diagram of a three-dimensional image processing apparatus according to an embodiment 1 of the present invention.

FIG. 1 is a schematic diagram of a three-dimensional image processing apparatus 10 according to the embodiment 1 of the present invention. The three-dimensional image processing apparatus 10 is, for example, a digital video recorder as shown in FIG. 1. This three-dimensional image processing apparatus 10, for example, decodes a compressed three-dimensional video signal recorded in a recording medium to output the decoded 3D video signal to a digital TV 20 via a HDMI cable or the like.

Although a concrete example of the recording medium is not particularly limited, for example, an optical disc such as a Blu-ray Disc (BD) or a Digital Versatile Disc (DVD), a magnetic disk such as a Hard Disk Drive (HDD), a nonvolatile memory, or the like, may be adopted.

Furthermore, without being limited to a three-dimensional video signal recorded in a recording medium, this three-dimensional image processing apparatus 10 may decode a three-dimensional video signal included in broadcast wave to output the decoded three-dimensional video signal to the digital TV 20. The broadcast wave is, for example, terrestrial digital television broadcasting, satellite digital broadcasting, or the like.

Moreover, this 3D image processing apparatus 10 is not limited to a digital video recorder, and, for example, may be a digital video camera including an imaging unit. That is, the three-dimensional image processing apparatus 10 may convert a three-dimensional video signal outputted from a digital video camera to output the converted three-dimensional video signal to a display apparatus (TV or the like) or a recording apparatus (digital video recorder or the like) via a HDMI cable or the like.

Figure 2:
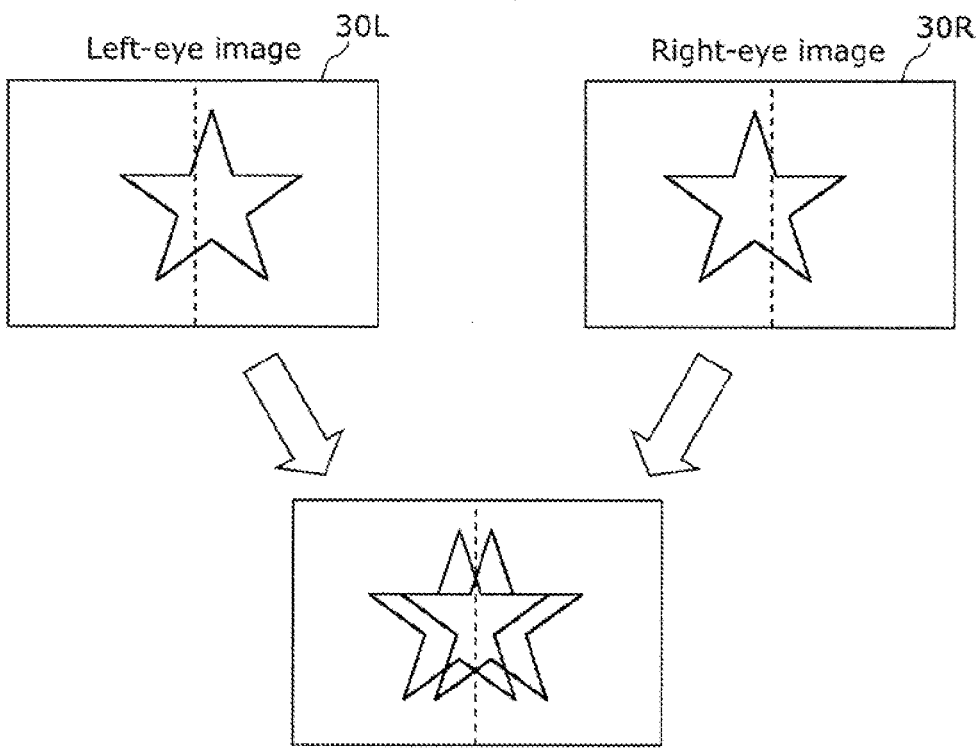
FIG. 2 is a conceptual diagram for illustrating a three-dimensional image that is format-converted by the three-dimensional image processing apparatus and displayed on a digital TV.

FIG. 2 is a conceptual diagram for illustrating a three-dimensional image processed by the three-dimensional image processing apparatus 10 and displayed on a digital TV 20.

As shown in FIG. 2, a three-dimensional video signal includes a left-eye image 30L and a right-eye image 30R. The left-eye image 30L and the right-eye image 30R have a parallax therebetween, depending on a distance from a capturing position to an object to be captured. The digital TV 20, for example, alternately displays the left-eye image 30L and the right-eye image 30R to display three-dimensional video which provides a user with stereoscopic perception.

Figure 3:
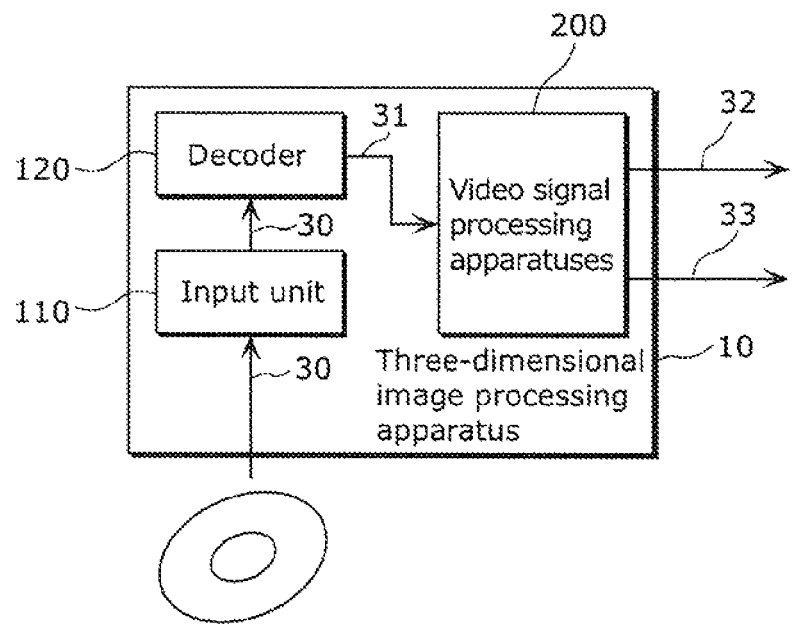
FIG. 3 is a functional block diagram of the three-dimensional image processing apparatus according to the embodiment 1 of the present invention.

Next, FIG. 3 is a functional block diagram of the three-dimensional image processing apparatus 10 according to the embodiment 1. As shown in FIG. 3, the three-dimensional image processing apparatus 10 includes an input unit 110, a decoder 120, and a video signal processing apparatus 200.

The input unit 110 obtains a three-dimensional video signal 30 recorded in a recording medium. The three-dimensional video signal 30 includes, for example, coded three-dimensional video that is compression-coded in accordance with a standard such as a MPEG-4 AVC/H.264. The decoder 120 decodes the three-dimensional video signal 30 obtained by the input unit 110 to generate a three-dimensional input signal (3D input signal) 31 that is a three-dimensional video signal. The video signal processing apparatus 200 performs a signal possess on the 3D input signal 31 generated by the decoder 120 to output a three-dimensional output signal (3D output signal) 32 and a two-dimensional output signal (2D output signal).

It is to be noted that a 3D input signal 31 includes a left-eye input signal and a right-eye input signal which have a parallax therebetween. In the same manner, a 3D output signal 32 includes a left-eye output signal and a right-eye output signal which have a parallax therebetween.

Figure 4:
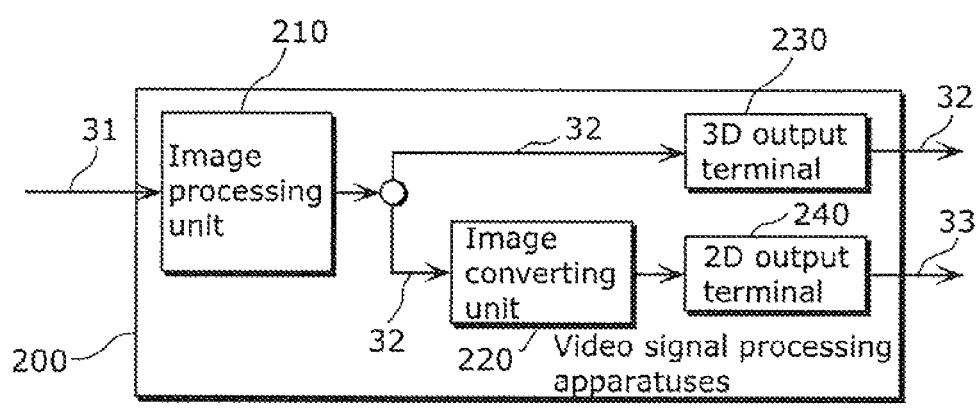
FIG. 4 is a functional block diagram of a video signal processing apparatus according to the embodiment 1 of the present invention.

Next, FIG. 4 is a functional block diagram of the video signal processing apparatus 200 according to the embodiment 1. As shown in FIG. 4, the video signal processing apparatus 200 includes an image processing unit 210, an image converting unit 220, a 3D output terminal (first output terminal) 230, and a 2D output terminal (second output terminal) 240.

The image processing unit 210 performs image processing on a 3D input signal 31 to generate a 3D output signal 32 including a left-eye output signal and a right-eye output signal. Although concrete content of the image processing is not particularly limited, an example includes a resizing process to expand or contract a left-eye input image and a right-eye input image, an IP converting process to convert a scanning scheme of the 3D input signal 31 from one into the other between a progressive scheme and an interlace scheme, a frame rate converting process to convert a frame rate of a 3D input signal 31, a noise reduction process (NR process) to reduce noise of a 3D input signal 31, and an On Screen Display (OSD) superimposing process to superimpose a caption, a menu screen, and the like onto a 3D input signal 31.

The image converting unit 220 converts the 3D output signal 32 outputted from the image processing unit 210 to output a 2D output signal 33. Specifically, the image converting unit 220 performs a 3D/2D converting process to convert the 3D output signal 32 that is a three-dimensional video signal into a 2D output signal 33 that is a two-dimensional video signal. In addition to the 3D/2D converting process, a down-converting process to change the definition (mainly to lower the definition) may also be included.

The 3D output terminal 230 outputs a 3D output signal 32 that is a three-dimensional video signal. Although a concrete example of the output terminal is not particularly limited, for example, a High-Definition Multimedia Interface (HDMI) output terminal may be used. The 2D output terminal 240 outputs a 2D output signal 33 that is a two-dimensional video signal. Although a concrete example of the output terminal is not particularly limited, for example, a DAC output terminal or a composite output terminal may be used.

It is to be noted that a 3D output signal 32 and a 2D output signal 33 are signals showing the same content, and the difference is whether the signal is a three-dimensional video signal or a two-dimensional video signal. Furthermore, the 3D output terminal 230 simultaneously outputs a 3D output signal 32 and the 2D output terminal 240 outputs a 2D output signal 33. However, "simultaneously" here does not require a 3D output signal 32 and a 2D output signal 33 to be outputted in precise synchronization. That is, it is sufficient if a signal is outputted from both of the 3D output terminal 230 and the 2D output terminal 240 in parallel, not selectively from one of the 3D output terminal 230 and the 2D output terminal 240.

Figure 5:
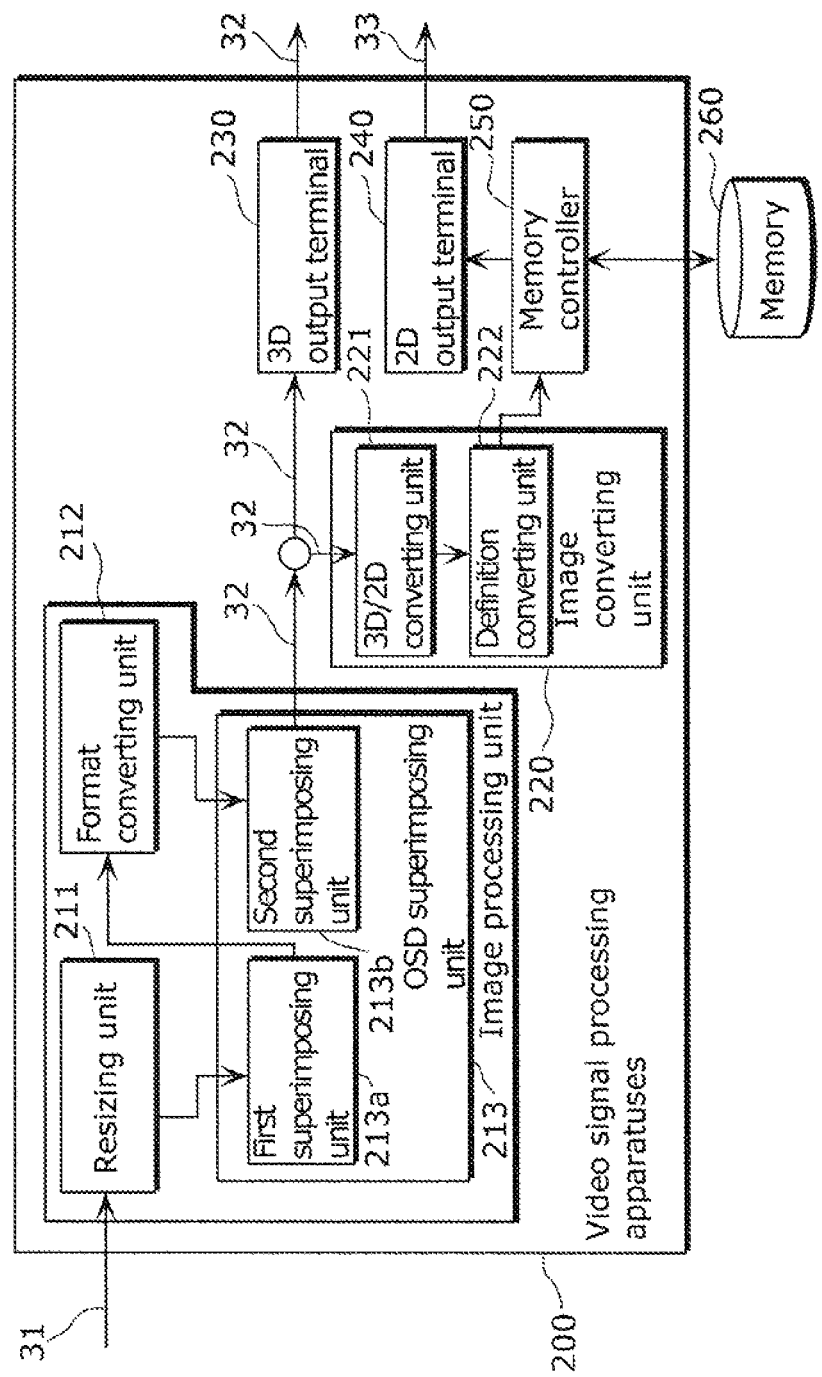
FIG. 5 is a detailed functional block diagram of the video signal processing apparatus shown in FIG. 4.
Figure 6:
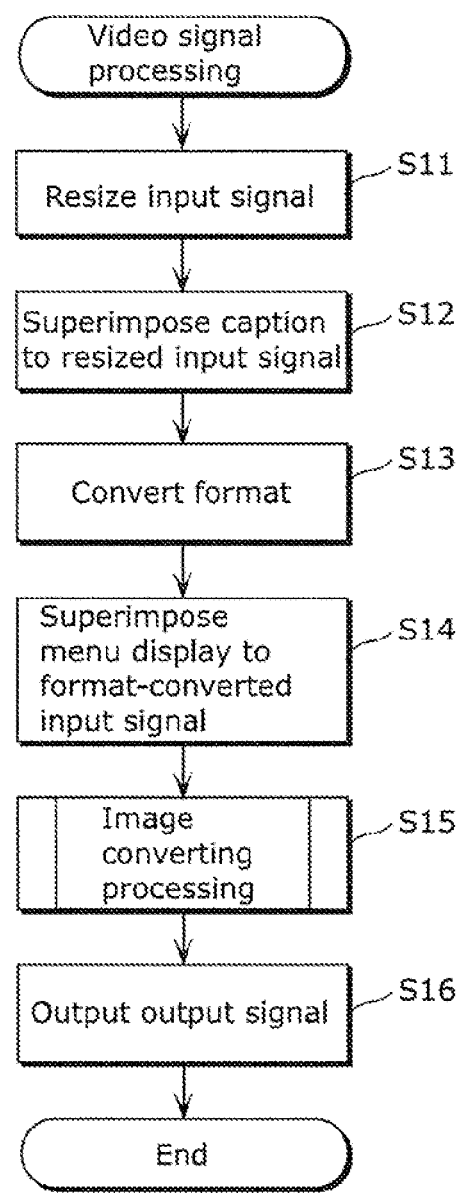
FIG. 6 is a flow chart showing an operation of the video signal processing apparatus shown in FIG. 5.

Next, FIG. 5 is a detailed functional block diagram of the video signal processing apparatus 200 shown in FIG. 4. Furthermore, FIG. 6 is a flow chart for showing an operation of the video signal processing apparatus 200 shown in FIG. 5. However, it goes without saying that the video signal processing apparatus 200 according to the present invention is not limited to the forms shown in FIG. 5 and FIG. 6.

As shown in FIG. 5, the image processing unit 210 includes a resizing unit 211, a format converting unit 212, and an OSD superimposing unit 213. Furthermore, the OSD superimposing unit 213 includes a first superimposing unit 213a and a second superimposing unit 213b. However, each of the constituent elements is not necessary for the present invention and therefore a part or all of the above constituent elements may be omitted. Furthermore, other constituent elements may also be added.

The resizing unit 211 changes (expands or contacts) the size of the left-eye input image and the right-eye input image included in the 3D input signal 31 (S11). As a typical example, the resizing unit 211 contracts an image (thins pixels) according to a ratio of the image to a menu screen and the like to be superimposed by the OSD superimposing unit 213. In contrast, the resizing unit 211 may expand an image by interpolating pixels between original pixels.

The format converting unit 212 converts the signal outputted from the resizing unit 211 into a signal compatible with an output format. Specifically, the resizing unit 211 and the first superimposing unit 213a perform processing on an original image (three-dimensional video signal inputted to the input unit 110). In contrast, the second superimposing unit 213b and the image converting unit 220 (both of which are the functional blocks in a downstream of the format converting unit 212) performs processing on an image to be displayed on the digital TV 20.

The format converting unit 212 performs, for example, an IP converting process to change the scanning scheme (S13). That is, when the 3D input signal 31 is scanned by the interlace scheme and the 3D output signal 32 is scanned by the progressive scheme (or vice versa), the format converting unit 212 performs the IP converting process to change the scanning scheme.

In addition to or instead of the IP converting process, a frame rate converting process to change the frame rate may be performed. That is, a 3D input signal 31 having a low frame rate (60 fps) may be converted to have a high frame rate (120 fps), or vice versa. Moreover, the format converting unit 212 may perform a filtering process to change an angle of view according to the display apparatus to which the format converting unit 212 outputs a signal.

The OSD superimposing unit 213 superimposes (synthesizes) another signal onto the 3D input signal 31. For example, the OSD superimposing unit 213 performs processing of superimposing a caption onto a lower region of video, or inserting such as a menu screen into a region obtained by the contraction of the image.

The first superimposing unit 213a mainly performs processing for superimposing a caption and the like (S12). This process is performed before the process by the format converting unit 212 is performed. The second superimposing unit 213b mainly performs processing for setting a menu screen and the like (S13). This process is performed after the process by the format converting unit 212 is performed.

The image converting unit 220 includes a 3D/2D converting unit 221 and the definition converting unit 222, and performs the image converting process (S15). However, the definition converting unit 222 is not necessary for the present invention and may be omitted. Furthermore, other constituent elements may also be added.

The 3D/2D converting unit 221 extracts only one of the left-eye output signal and the right-eye output signal included in the 3D output signal 32 to convert the three-dimensional video signal into a two-dimensional video signal. Concrete content of the process is described later by dividing into a case where the 3D output signal 32 is a line sequential signal and a case where the 3D output signal 32 is a frame sequential signal.

The definition converting unit 222 changes the definition (image quality) of the signal converted into the two-dimensional video signal by the 3D/2D converting unit 221. As a typical example, the definition converting unit 222 performs the down-converting process to convert a full high definition image (1920×1080) into a high definition image (1280×720) or a VGA (640×480).

It is to be noted that the 2D output signal 33 outputted from the definition converting unit 222 is temporarily stored in a memory 260 via a memory controller 250, and then outputted to the 2D output terminal 240 again via the memory controller

250. Here, the memory controller 250 and the memory 260 may be constituent elements of the video signal processing apparatus 200, or the video signal processing apparatus 200 may be structured to access to external constituent elements.

Then, the 3D output signal 32 outputted from the image processing unit 210 is outputted from the 3D output terminal 230, in parallel with the 2D output signal 33 outputted from the image converting unit 220 being outputted from the 2D output terminal 240 (S16).

The video signal processing apparatus 200 structured as described above can convert the 3D output signal 32, converted into an output format, into a 2D output signal 33 to output (i) the 3D output signal 32 from the 3D output terminal 230 and (ii) the 2D output signal 33 from the 2D output terminal 240 in parallel.

Figure 7:
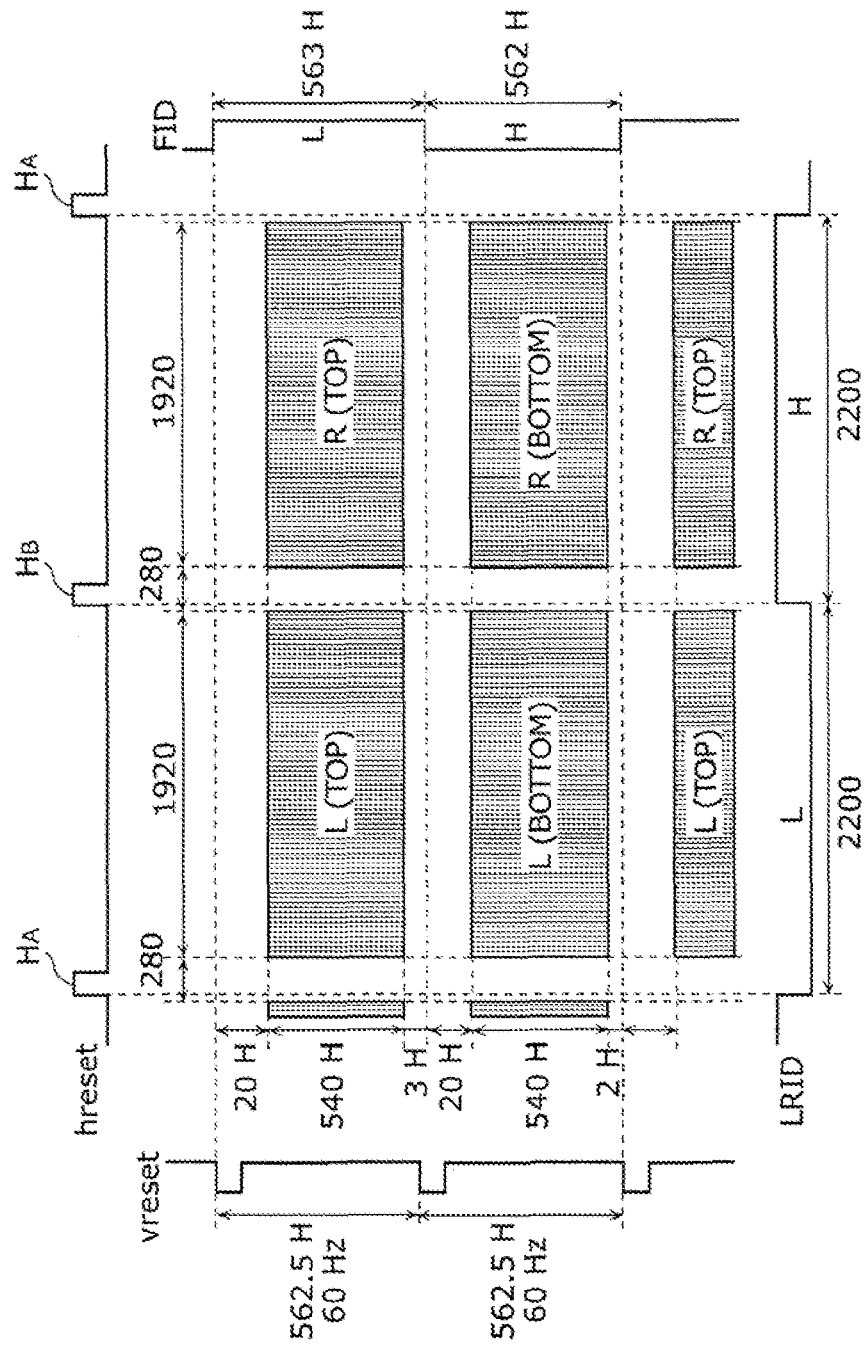
FIG. 7 shows an example of a 3D output signal inputted to an image converting unit.
Figure 8:
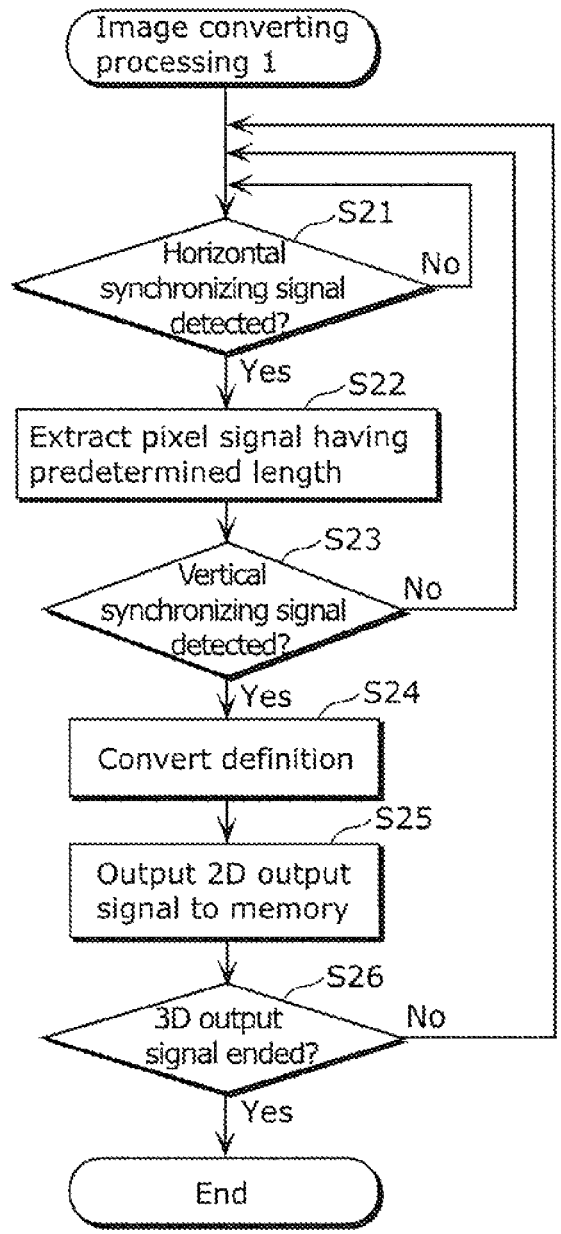
FIG. 8 is a flow chart showing an example of an image converting process.

Next, an example of the image converting process performed by the image converting unit 220 is described with reference to FIG. 7 and FIG. 8. It is to be noted that FIG. 7 shows an example of the 3D output signal 32 inputted to the image converting unit 220. FIG. 8 is a flow chart showing an example of the image converting process.

The 3D output signal 32 shown in FIG. 7 is a full high definition image (1920×1080) having a frame rate of 120 Hz, and the scanning scheme is the interlace scheme. Furthermore, the 3D output signal 32 is a line sequential signal in which a line of the left-eye output signal and a line of the right-eye output signal are alternately outputted.

Furthermore, the 3D output signal 32 is added with a synchronizing signal. In the example shown in FIG. 7, a horizontal synchronizing signal (hreset) and a Left-Right ID (LRID), and a vertical synchronizing signal (vreset) and a Frame ID (FID) are added, the horizontal synchronizing signal indicating a breakpoint of a line and the vertical synchronizing signal indicating a breakpoint of a picture (field, in the interlace scheme).

The horizontal synchronizing signal is a signal indicating a breakpoint of a line. Specifically, the horizontal synchronizing signal includes a first horizontal synchronizing signal (described as "$H_A$" in FIG. 7) and a second horizontal synchronizing signal (described as "$H_B$" in FIG. 7), the first horizontal synchronizing signal indicating an end of a right-eye output signal and a start of a left-eye output signal, and the second horizontal synchronizing signal indicating an end of a left-eye output signal and a start of a right-eye output signal. In contrast, the vertical synchronizing signal is a signal indicating a breakpoint of a top field and a bottom field. It is to be noted that, in the example in FIG. 7, a predetermined margin is provided before and after the horizontal synchronizing signal and the vertical synchronizing signal. That is, practically, reading of a pixel signal is started a few clocks after a synchronizing signal is detected.

Furthermore, the LRID indicates that (i) a signal is a left-eye output signal in a period that a signal level is in a Low state and (ii) a signal is a right-eye output signal in a period that the signal level is in a High state. In contrast, the FID indicates that (i) a signal is a top field in a period that a signal level is in a Low state and (ii) a signal is a bottom field in a period that the signal level is in a High state.

The 3D output terminal 230 outputs these synchronizing signals with the 3D output signal 32. The display apparatus (not shown in the drawing), connected to the 3D output terminal 230, reads the left-eye output signal and the right-eye output signal from the 3D output signal 32 using these synchronizing signals to display the image on the display. Consequently, the left-eye output signal and the right-eye output signal having a parallax therebetween are alternately displayed, and three-dimensional video that provides a user with stereoscopic perception is displayed.

FIG. 7 shows a flow of processing, performed by the image converting unit 220, for reading only the left-eye output signal from the 3D output signal 32 using the horizontal synchronizing signal and the vertical synchronizing signal. In this case, the second horizontal synchronizing signal $H_B$ included in the horizontal synchronizing signal is omitted and only the first horizontal synchronizing signal $H_A$ is supplied to the image converting unit 220.

It is to be noted that processing of removing a second horizontal synchronizing signal $H_B$ from a synchronizing signal may be, for example, controlled by a program executed by a CPU (not shown in the drawing) of the three-dimensional image processing apparatus 10 (software control). Alternately, an LSI of the image converting unit 220 may be designed so as to ignore a second horizontal synchronizing signal $H_B$ (hardware control).

First, the 3D/2D converting unit 221 monitors a horizontal synchronizing signal (first horizontal synchronizing signal $H_A$) (S21). After detecting the horizontal synchronizing signal (Yes in S21), the 3D/2D converting unit 221 reads a pixel signal having a predetermined length (1920 pixels) out of the 3D output signal 32 (S22). The 3D/2D converting unit 221 repeats the processing (S21 and S22) until detecting a vertical synchronizing signal (S23). It is to be noted that the pixel signal read in S22 is sequentially accumulated in a memory (not shown in the drawing) until the 3D/2D converting unit 221 detects a vertical synchronizing signal.

Next, After detecting the vertical synchronizing signal (Yes in S23), the 3D/2D converting unit 221 outputs the pixel signal accumulated in the memory to the definition converting unit 222. It is to be noted that the signal outputted here corresponds to a picture (field) of a left-eye output signal. Furthermore, the content of the memory is cleared after the signal is outputted.

However, the processing of accumulating the pixel signal read in S22 into a memory is not necessary. Specifically, when the 3D/2D converting unit 221 does not process vertical filtering processing, there is no need to temporarily accumulate the signal to the memory and the 3D/2D converting unit 221 may directly output the signal to the definition converting unit 222 in the order that the 3D/2D converting unit 221 reads the signal.

Next, the definition converting unit 222 converts the definition of the image obtained by the 3D/2D converting unit 221 (S24) and output the converted image, as a 2D output signal 33 that is a two-dimensional video signal, to the memory 260 via the memory controller 250 (S25). The image converting unit 220 repeats the above processing (S21 to S25) until the 3D output signal 32 ends (S23).

The 2D output signal 33 stored in the memory 260 is sequentially outputted from the 2D output terminal 240. Here, the frame rate of the 2D output signal 33 is half (namely, 60 Hz) of the 3D output signal 32. The 2D output signal 33 includes only the left-eye output signal so that the display apparatus (not shown in the drawing) connected to the 2D output terminal 240 displays two-dimensional video same as conventional video.

Although the above embodiment has described an example of reading the left-eye output signal using the horizontal synchronizing signal and the vertical synchronizing signal, without being limited to the example, the LRID and the FID may also be used. Specifically, the 3D/2D converting unit 221 may also be structured to (i) read a pixel signal only in a period that the signal level of the LRID is in the Low state and (ii) store the read pixel signal into the memory, so as to output the pixel signal in the memory every time the signal level of the FID is switched. Furthermore, the above processing can be realized by a combination of (i) the horizontal synchronizing signal and the FID or (ii) the LRID and the vertical synchronizing signal.

Furthermore, it goes without saying that, although the above embodiment has described an example of reading only the left-eye output signal from the 3D output signals 32, without being limited to the example, only the right-eye output signal may be read. In this case, only the second horizontal synchronizing signal $H_B$ is supplied to the image converting unit 220. The 3D/2D converting unit 221 detects the second horizontal synchronizing signal $H_B$ and then reads a pixel signal having a predetermined length.

Figure 9:
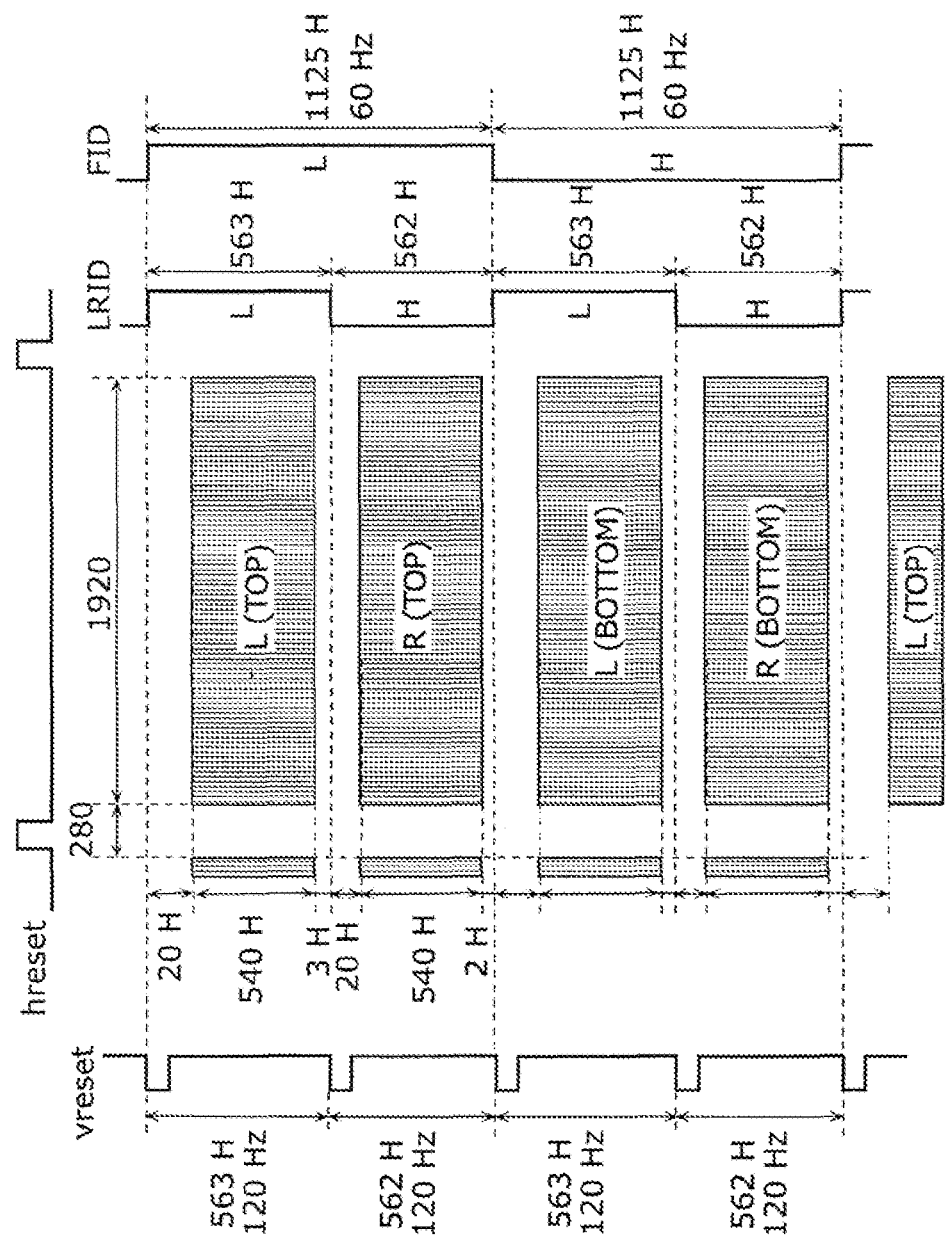
FIG. 9 shows another example of the 3D output signal inputted to the image converting unit.
Figure 10:
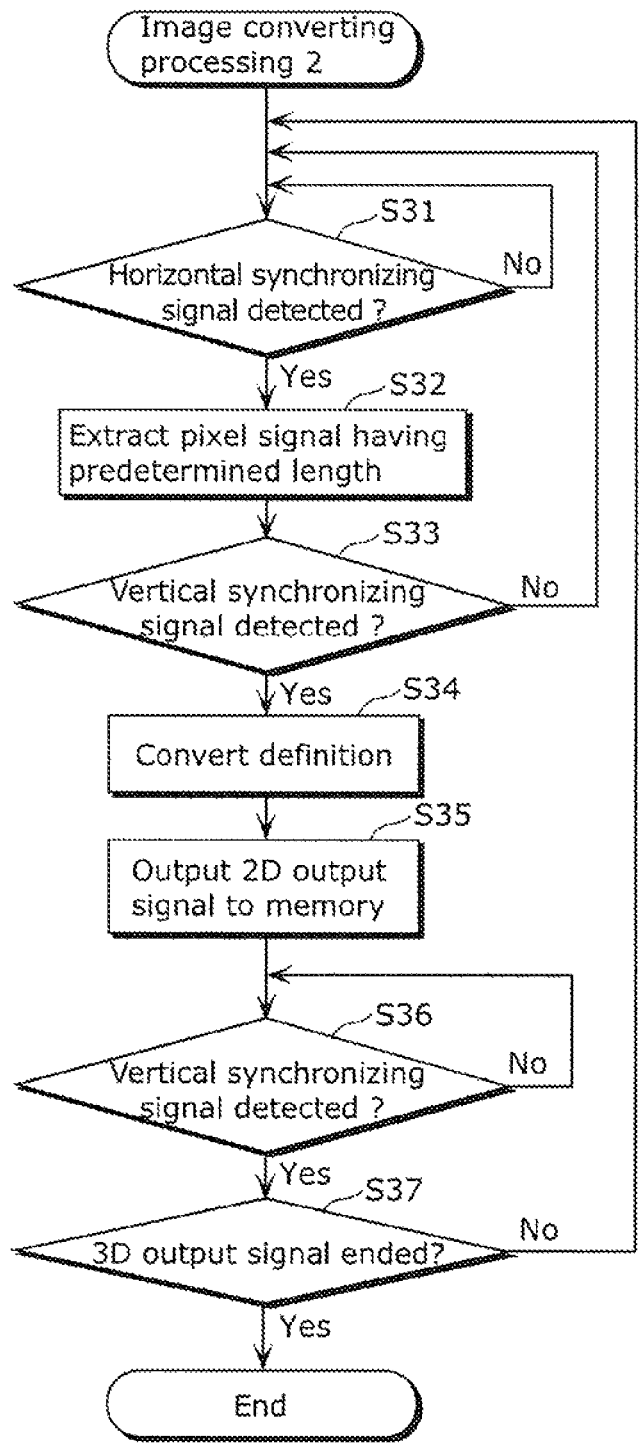
FIG. 10 is a flow chart showing another example of the image converting process.

Next, another example of the image conversion processing performed by the image converting unit 220 is described with reference to FIG. 9 and FIG. 10. It is to be noted that FIG. 9 shows an example of the 3D output signal 32 inputted to the image converting unit 220. FIG. 10 is a flow chart showing another example of the image conversion processing.

The 3D output signal 32 shown in FIG. 9 is a full high definition image (1920×1080) having a frame rate of 120 Hz, and the scanning scheme is the interlace scheme. Furthermore, the 3D output signal 32 is a frame sequential signal in which a picture (field) of the left-eye output signal and a picture (field) of the right-eye output signal are alternately outputted. Description on the synchronizing signals is omitted since each of the synchronizing signals is the same as in FIG. 7, except that there is no distinction as the above ($H_A$ and $H_B$) in the horizontal synchronizing signal.

First, the 3D/2D converting unit 221 monitors a horizontal synchronizing signal (S31). After detecting the horizontal synchronizing signal (Yes in S31), the 3D/2D converting unit 221 reads a pixel signal having a predetermined length (1920 pixels) out of the 3D output signal 32 (S32). The 3D/2D converting unit 221 repeats the processing (S31 and S32) until detecting a vertical synchronizing signal (S33). It is to be noted that the pixel signal read in S32 is sequentially accumulated in the memory (not shown in the drawing) until the 3D/2D converting unit 221 detects a vertical synchronizing signal.

Next, after detecting the vertical synchronizing signal (Yes in S33), the 3D/2D converting unit 221 outputs the pixel signal accumulated in the memory to the definition converting unit 222. It is to be noted that the signal outputted here corresponds to 1 picture (field) of a left-eye output signal. Furthermore, the content of the memory is cleared after the signal is outputted.

Next, the definition converting unit 222 converts the definition of the image obtained by the 3D/2D converting unit 221 (S34) and output the converted image, as a 2D output signal 33 that is a two-dimensional video signal, to the memory 260 via the memory controller 250 (S35).

Next, the 3D/2D converting unit 221 stops the processing until detecting the next vertical synchronizing signal. Specifically, by controlling a μ code using the CPU of the three-dimensional image processing apparatus 10, the 3D/2D converting unit 221 is caused to stop accessing to the 3D output signal 32. The image converting unit 220 repeats the above processing (S31 to S36) until the 3D output signal 32 ends (S33).

The 2D output signal 33 stored in the memory 260 is sequentially outputted from the 2D output terminal 240. Here, the frame rate of the 2D output signal 33 is half (namely, 60 Hz) of the 3D output signal 32. The 2D output signal 33 includes only the left-eye output signal so that the display apparatus (not shown in the drawing) connected to the 2D output terminal 240 displays the two-dimensional video same as the conventional video.

Although the above embodiment has described an example of reading the left-eye output signal using the horizontal synchronizing signal and the vertical synchronizing signal, without being limited to the example, the LRID and the FID may also be used. For example, the 3D/2D converting unit 221 may also be structured to (i) read a pixel signal only in a period that the signal level of the LRID is in the Low state and (ii) stop the processing in a period that the signal level is in the High state. Furthermore, the above processing can be realized with other combinations of the synchronizing signals.

Furthermore, it goes without saying that, although the above embodiment has described an example of reading only the left-eye output signal from the 3D output signal 32, without being limited to the example, only the right-eye output signal may be read.

As a favorable use of the three-dimensional image processing apparatus 10 structured as the above, for example, when a TV connected to the 3D output terminal 230 does not display three-dimensional video, the operation can be checked by connecting the TV to the 2D output terminal 240. It is also possible to cause a recording apparatus connected to the 2D output terminal 240 to record two-dimensional video while viewing three-dimensional video on a TV connected to the 3D output terminal 230.

It is to be noted that the three-dimensional image processing apparatus 10 above makes it possible to share a large part of processing blocks with a two-dimensional image processing apparatus which outputs (i) a two-dimensional HD image from a first output terminal and (ii) a two-dimensional SD image resulting from down-converting the two-dimensional HD image. This leads to a significant reduction in manufacturing costs. Furthermore, although each of the above examples has described a case where the 3D output signal 32 is a signal in which a picture of the left-eye output signal and a picture of the right-eye output signal are alternately outputted, without being limited to the example, the present invention can be applied to a 3D output signal in a format which includes both a left-eye pixel and a right-eye pixel in a picture.

In this case, it is sufficient for the 3D/2D converting unit 221 to extract one of the left-eye pixel and the right-eye pixel to generate a 2D output signal. Furthermore, the 2D output image generated as described above has half the normal number of pixels, and therefore processing for interpolating pixels corresponding to the amount of the right-eye pixel may also be added.

Other Modification Examples

It is to be noted that although the present invention is described based on aforementioned embodiment, the present invention is obviously not limited to such embodiment. The following cases are also included in the present invention.

Each of the aforementioned apparatuses is, specifically, a computer system including a microprocessor, a ROM, a RAM, a hard disk unit, a display unit, a keyboard, a mouse, and the so on. A computer program is stored in the RAM or hard disk unit. The respective apparatuses achieve their functions through the microprocessor's operation according to the computer program. Here, the computer program is configured by combining plural instruction codes indicating instructions for the computer, in order to achieve predetermined functions.

A part or all of the constituent elements constituting the respective apparatuses may be configured from a single System-LSI (Large-Scale Integration). The System-LSI is a super-multi-function LSI manufactured by integrating constituent elements on one chip, and is specifically a computer system configured by including a microprocessor, a ROM, a RAM, and so forth. The System-LSI is a super-multi-function LSI manufactured, by integrating constituent elements on one chip, and is specifically a computer system configured by including a microprocessor, a ROM, a RAM, and so forth. A computer program is stored in the RAM. The respective apparatuses achieve their functions through the microprocessor's operation according to the computer program.

A part or all of the constituent elements constituting the respective apparatuses may be configured as an IC card which can be attached and detached from the respective apparatuses or, as a stand-alone module. The IC card or the module may also include the aforementioned super-multi-function LSI. The IC card or the module achieves its function through the microprocessor's operation according to the computer program. The IC card or the module may also be implemented to be tamper-resistant.

The present invention may be a method of the above. The present invention may be a computer program for realizing the previously illustrated method, using a computer, and may also be a digital signal including the computer program.

Furthermore, the present invention may also be realized by storing the computer program or the digital signal in a computer readable recording medium such as flexible disc, a hard disk, a CD-ROM, an MO, a DVD, a DVD-ROM, a DVD-RAM, a BD (Blu-ray Disc), and a semiconductor memory. Furthermore, the present invention also includes the digital signal recorded in these recording media.

Furthermore, the present invention may also be realized by the transmission of the aforementioned computer program or digital signal via a telecommunication line, a wireless or wired communication line, a network represented by the Internet, a data broadcast and so forth.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible.

The above embodiment and the modification examples may be combined respectively.

The embodiment of the present invention has been described with reference to the drawings. However, the present invention is not limited to the embodiment illustrated. It is possible to add, to the embodiment illustrated, various corrections or modifications along with the full scope of equivalents to the present invention.

INDUSTRIAL APPLICABILITY

The present invention may be favorably used as a video signal processing apparatus.

The invention claimed is:

1. A video signal processing apparatus comprising:
an input unit configured to receive a three-dimensional input signal including a left-eye input signal and a right-eye input signal;
an image processing unit configured to perform image processing on the three-dimensional input signal inputted to said input unit, and to generate a three-dimensional output signal including a left-eye output signal and a right-eye output signal;
an image converting unit configured to extract one of the left-eye output signal and the right-eye output signal from the three-dimensional output signal generated by said image processing unit, and to generate a two-dimensional output signal;
a first output terminal which outputs the three-dimensional output signal generated by said image processing unit; and
a second output terminal which outputs the two-dimensional output signal generated by said image converting unit,
wherein the three-dimensional output signal and the two-dimensional output signal are such that a three-dimensional-compatible device connected to said first output terminal is capable of displaying three-dimensional video at a same time as a non-three-dimensional-compatible device connected to said second output terminal is capable of displaying or recording two-dimensional video.

2. The video signal processing apparatus according to claim 1,
wherein the three-dimensional output signal is a line sequential signal in which a line of the left-eye output signal and a line of the right-eye output signal are alternately outputted, and
said image converting unit includes a 3D/2D converting unit configured to extract one of the left-eye output signal and the right-eye output signal from the three-dimensional output signal by repeating, until detecting a vertical synchronizing signal indicating a breakpoint of a picture, processing of (i) detecting a horizontal synchronizing signal indicating a start of the one of the left-eye output signal and the right-eye output signal extracted by said 3D/2D converting unit and (ii) reading a signal of a predetermined length that starts from a point at which the horizontal synchronizing signal is detected.

3. The video signal processing apparatus according to claim 1,
wherein the three-dimensional output signal is a frame sequential signal in which a picture of the left-eye output signal and a picture of the right-eye output signal are alternately outputted, and
said image converting unit includes a 3D/2D converting unit configured to extract one of the left-eye output signal and the right-eye output signal from the three-dimensional output signal by (i) detecting a vertical synchronizing signal indicating a breakpoint of a picture and (ii) switching between executing and stopping processing of reading a signal at each time of detecting the vertical synchronizing signal.

4. The video signal processing apparatus according to claim 2, wherein said image converting unit further includes a definition converting unit configured to convert a definition of a signal outputted by said 3D/2D converting unit.

5. The video signal processing apparatus according to claim 1, wherein said image processing unit includes:
a resizing unit configured to change a size of the three-dimensional input signal and to output a resized signal;
a format converting unit configured to convert the resized signal outputted from said resizing unit into a signal compatible with an output format; and
an On Screen Display (OSD) superimposing unit configured to superimpose another signal onto at least one of a signal prior to processing by said format converting unit and a signal after the processing by said format converting unit.

6. A video signal processing method comprising:

receiving a three-dimensional input signal including a left-eye input signal and a right-eye input signal;

performing image processing on the three-dimensional input signal inputted in said receiving of the three-dimensional input signal to generate a three-dimensional output signal including a left-eye output signal and a right-eye output signal;

extracting one of the left-eye output signal and the right-eye output signal from the three-dimensional output signal generated in said performing of the image processing to generate a two-dimensional output signal;

outputting the three-dimensional output signal generated in said performing of the image processing; and outputting the two-dimensional output signal generated in said extracting, wherein the three-dimensional output signal and the two-dimensional output signal are such that a three-dimensional-compatible device receiving the three-dimensional output signal is capable of displaying three-dimensional video at a same time as a non-three-dimensional-compatible device receiving the two-dimensional output signal is capable of displaying or recording two-dimensional video.

* * * * *